US011315228B2

(12) United States Patent
Vaidyanathan et al.

(10) Patent No.: US 11,315,228 B2
(45) Date of Patent: Apr. 26, 2022

(54) SYSTEM AND METHOD FOR MINERAL EXPLORATION

(71) Applicant: Accenture Global Solutions Limited, Dublin (IE)

(72) Inventors: Vivek Vaidyanathan, Palakkad (IN); Dinesh Kumar Vemula, Hyderabad (IN); Abhirama Rao, Mangaluru (IN); Bhudeep Hathi, Thane (IN); Narendra Kumar, Bengaluru (IN); Swati Acharjee, Pimpri-Chinchwad (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/877,092

(22) Filed: May 18, 2020

(65) Prior Publication Data

US 2021/0358103 A1 Nov. 18, 2021

(51) Int. Cl.
*G06T 7/00* (2017.01)
*G01V 5/12* (2006.01)
(Continued)

(52) U.S. Cl.
CPC ....... *G06T 7/0002* (2013.01); *B60W 60/0025* (2020.02); *G01V 5/12* (2013.01); *G06K 9/6267* (2013.01); *G06T 7/10* (2017.01)

(58) Field of Classification Search
CPC ....... G06T 7/0002; G06T 7/10; G06K 9/6267; G01V 5/12; B60W 60/0025
(Continued)

(56) References Cited

U.S. PATENT DOCUMENTS 4,449,047 A 5/1984 Monroe
7,324,899 B2 1/2008 Zhdanov
(Continued)

FOREIGN PATENT DOCUMENTS

AU 2017245397 B2 1/2018
CA 2835395 C 12/2017
(Continued)

OTHER PUBLICATIONS

Dunlop, "Automatic Rock Detection and Classification in Natural Scenes", published Aug. 2006; Robotics Institute Carnegie Mellon University, Pittsburgh, Pennsylvania; https://pdfs.semanticscholar.org/1f87/08dd772cd6ccb394752a457869abef525cc4.pdf [retrieved Jun. 4, 2020].

(Continued)

*Primary Examiner* — Amandeep Saini
(74) *Attorney, Agent, or Firm* — Plumsea Law Group, LLC

(57) ABSTRACT

A system and method of identifying potential areas for mineral extraction is disclosed. The proposed systems and methods describe an autonomous mineral discovery platform that leverages robotics, X-Ray Florescence (XRF) technology, image analytics, smart devices, and IoT enabled devices to perform comprehensive field surveying and exploratory sampling. For example, by implementation of remote navigation and control, as well as field data capture and real-time data transmission capabilities, this platform can be configured to automatically identify rock types and their surface features and perform elemental composition analysis of surface while on-site and remote from the operator site.

20 Claims, 10 Drawing Sheets

(51) Int. Cl.
    *B60W 60/00*     (2020.01)
    *G06K 9/62*     (2022.01)
    *G06T 7/10*     (2017.01)

(58) Field of Classification Search
    USPC .......................................................... 382/100
    See application file for complete search history.

(56) References Cited

U.S. PATENT DOCUMENTS

| | | | |
|---|---|---|---|
| 2010/0131204 A1* | 5/2010 | Dvorkin | G01V 1/30 702/6 |
| 2018/0321546 A1 | 11/2018 | Sakai et al. | |
| 2019/0130223 A1* | 5/2019 | Anderson | G06K 9/6227 |
| 2020/0019752 A1* | 1/2020 | Frei | G06K 9/6256 |
| 2020/0132657 A1* | 4/2020 | King, Jr. | G06T 7/0004 |

FOREIGN PATENT DOCUMENTS

| | | | |
|---|---|---|---|
| CN | 101101338 A | | 10/2009 |
| CN | 107871316 A | | 3/2018 |
| CN | 109615024 A | * | 4/2019 |

OTHER PUBLICATIONS

Inocencio et al., "Spectral Pattern Classification in Lidar Data for Rock Identification in Outcrops", published Feb. 18, 2014; https://www.hindawi.com/journals/tswj/2014/539029/ [retrieved Jun. 4, 2020].

Kruse et al., "Mapping alteration minerals at prospect, outdrop and drill core scales using imaging spectrometry", published Mar. 20, 2012; https://www.ncbi.nlm.nih.gov/pmc/articles/PMC4373138/ [retrieved Jun. 4, 2020].

Launeau et al., "Mineral recognition in digital images of rocks: a new approach using multichannel classification", published Jan. 1992; https://www.researchgate.net/publication/238269896_Mineral_recognition_in_digital_images_of_rocks_a_new_approach_using_multichannel_classification [retrieved Jun. 4, 2020].

Singh et al., "Application of image processing in mineral industry: a case study of ferruginous manganese ores", published Jul. 18, 2013; https://www.tandfonline.com/doi/abs/10.1179/174328506X109130 [retrieved Jun. 4, 2020].

"Geochemical Analysis of Iron Ore—SGS Geochemical Analysis for Iron Ore Exploration", SGS Minerals Services; T3 SGS 965; Sep. 2013 ; https://www.sgs.com/-/media/global/documents/flyers-and-leaflets/sgs-min-wa117-geochemical-analysis-of-iron-ore-en-11.pdf [retrieved Jun. 4, 2020].

"Mining—Sample Preparation"; https://www.sgs.com/en/mining/inspection-and-sampling-services/commercial-analysis/sample-preparation [retrieved Jun. 4, 2020].

"Mining—Chemical Testing"; https://www.sgs.com/en/mining/analytical-services/chemical-testing [retrieved Jun. 4, 2020].

Marr, "The 4th Industrial Revolution: How Mining Companies are Using AI, Machine Learning and Robots", published Sep. 7, 2018 ; https://www.forbes.com/sites/bernardmarr/2018/09/07/the-4th-industrial-revolution-how-mining-companies-are-using-ai-machine-learning-and-robots/#3f680557497e [retrieved Jun. 4, 2020].

Zeiler, "Introducing Clarifai's Mobile SDK—On-Device Machine Learning Whether You're Online or Offline", published Jul. 17, 2017; https://www.clarifai.com/blog/introducing-clarifais-mobile-sdk-on-device-machine-learning-whether-youre-online-or-offline [retrieved Jun. 4, 2020].

Everting, "IOT, Computer Vision, Collaboration, Clarifai: The Claricam Prototype", published Apr. 10, 2019; https://www.clarifai.com/blog/iot-cv-claricam [retrieved Jun. 4, 2020].

Wirth, "X-Ray Fluorescence (XRF)", Geochemical Instrumentation and Analysis ; https://serc.carleton.edu/research_education/geochemsheets/techniques/XRF.html [retrieved Jun. 4, 2020].

"VR and AR pushing connectivity limits"—Quailcomm Technologies, Inc., published Oct. 2018 ; https://www.qualcomm.com/media/documents/files/vr-and-ar-pushing-connectivity-limits.pdf [retrieved Jun. 4, 2020].

Lepisto, "Colour and texture based classification of rock images using classifier combinations", Tampere University of Technology Publication 593; published Apr. 7, 2006; https://tutcris.tut.fi/portal/files/1834966/lepisto.pdf [retrieved Jun. 4, 2020].

\* cited by examiner

SYSTEM AND METHOD FOR MINERAL EXPLORATION

TECHNICAL FIELD

The present disclosure generally relates to the enhancement and augmentation of mineral exploration processes. More specifically, the present disclosure generally relates to a system and method for intelligent, autonomous approaches to mineral exploration in order to effectively and efficiently identify resources for extraction.

BACKGROUND

In recent years, depletion of existing mineral resources has led to record investments in mineral exploration, yet are met with limited success. Depleting mineral resources have pressured mining operations to invest more time and energy toward initial mineral discovery and exploration phases. Such exploration operations are conventionally associated with high costs (e.g., 5-10% of the operation's net income) due to significant uncertainty factors and heavy reliance on manual labor. In addition, challenges remain, including inadequate field data capture (e.g., manual errors, inconsistent or missing data sets), delays in exploratory sampling and analysis as samples must be physically transported back to the lab for analysis, as well as difficulties in performing exploration in inaccessible terrains, around abandoned mines, or unsafe areas.

Increased cost of exploration, delays in exploratory sampling, and inhospitable rugged terrain has led to a call for innovation in this area. There is a need in the art for a system and method that addresses the shortcomings discussed above.

SUMMARY

A system and method for identifying areas for mineral extraction is disclosed. The system and method solve the problems discussed above by providing a comprehensive, autonomous mineral discovery platform incorporated into a remote-controlled vehicle that leverages robotics, X-Ray Florescence (XRF) technology, image analytics, smart devices, and IoT enabled devices to perform comprehensive field surveying and exploratory sampling. The architecture applies artificial intelligence models and near real-time analysis that can be performed remotely via the vehicle's onboard computing system. With image capture and processing occurring remotely, bypassing the need for data-heavy online transmissions of image data, the vehicle can easily operate offline and with little to no operator input for extended periods of time. The platform can also be configured to autonomously generate insights on surface outcrops of mineral deposits, as well as provide comprehensive data visualizations, ensuring a more rapid and accurate analysis of exploratory samples for geological mapping.

In one aspect, the disclosure provides a method of automating some or all aspects of identifying viable areas for mineral extraction. The method includes obtaining, via an onboard computing system for a vehicle, a first image for a first potential extraction area, the first image including a first outcrop sample, and automatically segmenting the first image into a plurality of image segments that includes a first image segment. The method also includes automatically feeding the plurality of image segments into a first image classification model configured to identify a first physical property of the first outcrop sample based on a first concept set associated with the first physical property. In addition, the method includes automatically assigning one concept of the first concept set to each image segment, the assigned concept including the highest likelihood of representing features present in the image segment, wherein an assignment of a first concept to the first image segment has a confidence value greater than confidence values for concept assignments to the remaining image segments of the plurality of image segments. The method further includes automatically assigning the first concept to the first image, and causing a computing device to generate a message identifying the first concept for the first outcrop sample.

In another aspect, the disclosure provides a system for automating some or all aspects of identifying areas for mineral extraction. The system includes a processor and machine-readable media including instructions which, when executed by the processor, cause the processor to obtain, via an onboard computing system for a vehicle, a first image for a first potential extraction area, the first image including a first outcrop sample, and automatically segment the first image into a plurality of image segments that includes a first image segment. The instructions further cause the processor to automatically feed the plurality of image segments into a first image classification model configured to identify a first physical property of the first outcrop sample based on a first concept set associated with the first physical property. In addition, the instructions cause the processor to automatically assign one concept of the first concept set to each image segment, the assigned concept including the highest likelihood of representing features present in the image segment, wherein an assignment of a first concept to the first image segment has a confidence value greater than confidence values for concept assignments to the remaining image segments of the plurality of image segments. In addition, the instructions cause the processor to automatically assign the first concept to the first image, and cause a computing device to generate a message identifying the first concept for the first outcrop sample.

In another aspect, the disclosure provides a system that includes one or more computers and one or more storage devices storing instructions that are operable, when executed by the one or more computers, to cause the one or more computers to obtain, via an onboard computing system for a vehicle, a first image for a first potential extraction area, the first image including a first outcrop sample, and automatically segment the first image into a plurality of image segments that includes a first image segment. The instructions further cause the processor to automatically feed the plurality of image segments into a first image classification model configured to identify a first physical property of the first outcrop sample based on a first concept set associated with the first physical property. In addition, the instructions cause the processor to automatically assign one concept of the first concept set to each image segment, the assigned concept including the highest likelihood of representing features present in the image segment, wherein an assignment of a first concept to the first image segment has a confidence value greater than confidence values for concept assignments to the remaining image segments of the plurality of image segments. In addition, the instructions cause the processor to automatically assign the first concept to the first image, and cause a computing device to generate a message identifying the first concept for the first outcrop sample.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
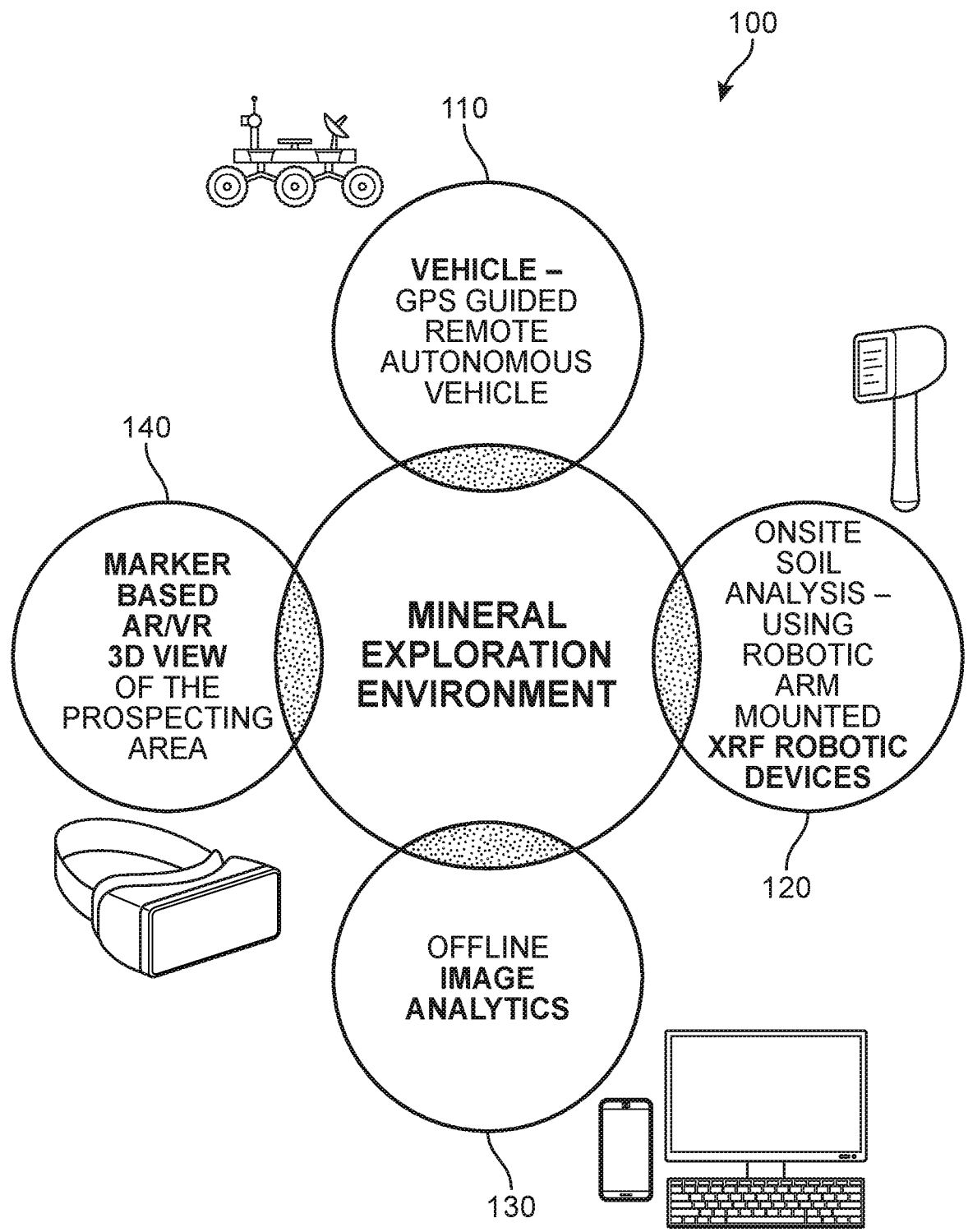
FIG. 1 is a schematic diagram of an embodiment of a mineral exploration system environment.

Mineral exploration refers to the process of locating commercially viable concentrations of minerals for extraction. However, such operations have become an increasingly 'high-risk high-reward'-type business as resources become scarcer. In addition, depleting ore grades demand an investment of higher exploration budgets, while weak metals prices are driving declining capital investments in exploration. However, with the advent of edge computing and large-scale data processing, copious volumes of data can be harvested, resulting in more accurate and timely insights. The proposed systems and methods describe an autonomous mineral discovery platform that leverages robotics, X-Ray Florescence (XRF) technology, image analytics, smart devices, and IoT enabled devices to perform comprehensive field surveying and exploratory sampling. For example, by implementation of remote vehicle navigation and control, as well as field data capture and real-time data transmission capabilities, this platform can be configured to automatically identify rock types and their surface features and perform elemental composition analysis of surface while on-site and remote from the geologist or other operator. The platform can also be configured to generate insights on surface outcrops of mineral deposits, ensuring a more rapid and accurate analysis of exploratory samples for geological mapping. This approach can be used to remotely conduct elemental analysis of mineral deposits complemented by image analytics to generate actionable insights, improving the analysis timeline of exploratory samples for geochemical analysis and corresponding mineral mapping. Artificial intelligence (AI) models are incorporated to ensure the platform continues to learn and evolve by leveraging geologist inputs and feedback. In addition, in some embodiments, data visualization can be enhanced by an augmented three-dimensional geological map presented to end-users via immersive devices (e.g., augmented reality (AR)/virtual reality (VR)).

As will be discussed in detail below, aspects of the proposed systems and methods may be incorporated to provide a highly effective functional mineral exploration architecture. For purposes of this disclosure, exploration refers to the search for mineral accumulations which can be profitably mined. In addition, the ore zone that is eventually shortlisted is referred to as a potential mineral discovery site, its and its designation is typically based on its economic viability which is calculated following a comprehensive risk analysis. The term low-level metal analysis refers to detection, identification and/or measurement of a concentration of a metal in an exploration sample containing the metal. Such a process may be performed, for example, with an X-ray fluorescence (XRF) detector, in particular a portable XRF (pXRF) detector. In addition, an outcrop refers to a visible exposure of bedrock or ancient superficial deposits on the surface of the Earth. Furthermore, the term sample will refer to a geological sample. The sample may include, but is not limited to, an ore, mineral, concentrate, tailings, soil, drill cutting, stream sediment or alluvial sediments. The field sampling or mineral exploration campaign will determine the sample size, size fraction, site selection, sample density, sample interval and so forth (see FIG. 6).

The complete exploration process can be defined by five key stages, including (1) area selection, (2) target identification, (3) target testing, (4) resource delineation, and (5) resource evaluation. The likelihood of a project progressing through each stage of exploration decreases drastically (on the order of 3,000 to 1) as the process moves through one stage to the next stage. The decision to proceed to the next stage of exploration relies on risk analysis, which includes consideration of factors such as health, safety, environmental, community, and political risks, as well as technical geological risks, where any one of these factors may be sufficient basis for a decision to discontinue a project. Thus, realization of a mining site has been typically very low, and efforts to maximize success during the exploration phase more imperative.

The exploration of a particular area for potential ore is carried out across these various stages, beginning with selection of an area that may extend up to several hundreds of square kilometers. The subsequent target identification stage involves the location and prospecting of mineral occurrences (targets) within a selected area. The proposed systems and methods are primarily directed toward redefining and improving these first two stages. However, it can be appreciated that such dramatic improvements will also cause an advantageous downstream impact on later stages.

The disclosed systems and methods are configured to optimize mineral exploration operations. Referring to FIG. 1, for purposes of introduction, a high-level overview of a mineral exploration system environment ("environment") 100 is depicted. Environment 100 includes a plurality of subsystems and device components ("components") that are coordinated to provide in-depth data to improve area selection and target identification. For example, environment 100 includes one or more remote autonomous vehicles ("rovers") 110 that may make use of onsite soil analysis mechanisms ("soil analyzers") 120 (e.g., robotic arm-mounted tools) integrated in the rovers 110. The rovers 110 may be guided by GPS remotely by human or machine operators. The soil analyzers 120 can include, but are not limited to XRF Robotic devices, where XRF is an acronym for x-ray fluorescence, a process whereby electrons are displaced from their atomic orbital positions, releasing a burst of energy that is characteristic of a specific element. This release of energy is then registered by the detector in then XRF instrument, which in turn categorizes the energies by element.

The environment 100 also includes an offline image analytics subsystem 130 that may be located in the rovers 110, and/or remotely relative to the rovers 110, as well as soil analyzers 120, which together can generate data that can be used to produce a marker-based AR/VR 3D view ("visualization subsystem") 140 of the prospecting area. The image analytics subsystem 130 can make use of any image analytics software, such as Clarifai, Google® Cloud Vision API, Amazon® Rekognition, OpenCV, Microsoft® Computer Vision API, DeepPy, IBM® Watson Visual Recognition, Keras, Deepdream, and others to enable machine learning for training and inference. In addition, the environment 100 can make use of Python, Tableau, Power BI, and other data science tools for model integration and simulation. Such an arrangement allows for near-real time geological mapping, offline data recording, and regular archiving on the cloud. The proposed environment 100 expediates the initial exploration process and enhances safety, as will be discussed in greater detail below.

Components of environment 100 may interconnect via wired connections, wireless connections, or a combination of wired and wireless connections. Furthermore, such components may utilize cloud computing resources (e.g., memory, bandwidth, random-access memory (RAM), processor, software, etc.) over a network to perform various operations, such as database queries, application program interface (API) calls, computational tasks, and/or the like. A cloud computing environment may provide a static cloud computing resource (e.g., referred to herein as a static cloud computing resource). Additionally, or alternatively, a cloud computing environment may provide a dynamic cloud computing resource (e.g., referred to herein as a dynamic cloud computing resource or a runtime cloud computing resource).

The various tools offered by environment 100 to an end-user, such as the offline image analytics subsystem 130 and visualization subsystem 140 can be accessed and executed via a user system, where such a system includes one or more devices capable of receiving, generating, storing, processing, and/or providing information associated with analyzing data related to resource utilization. For example, user systems 140 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. A user system also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by cloud computing resources or other systems or servers.

Figure 2:
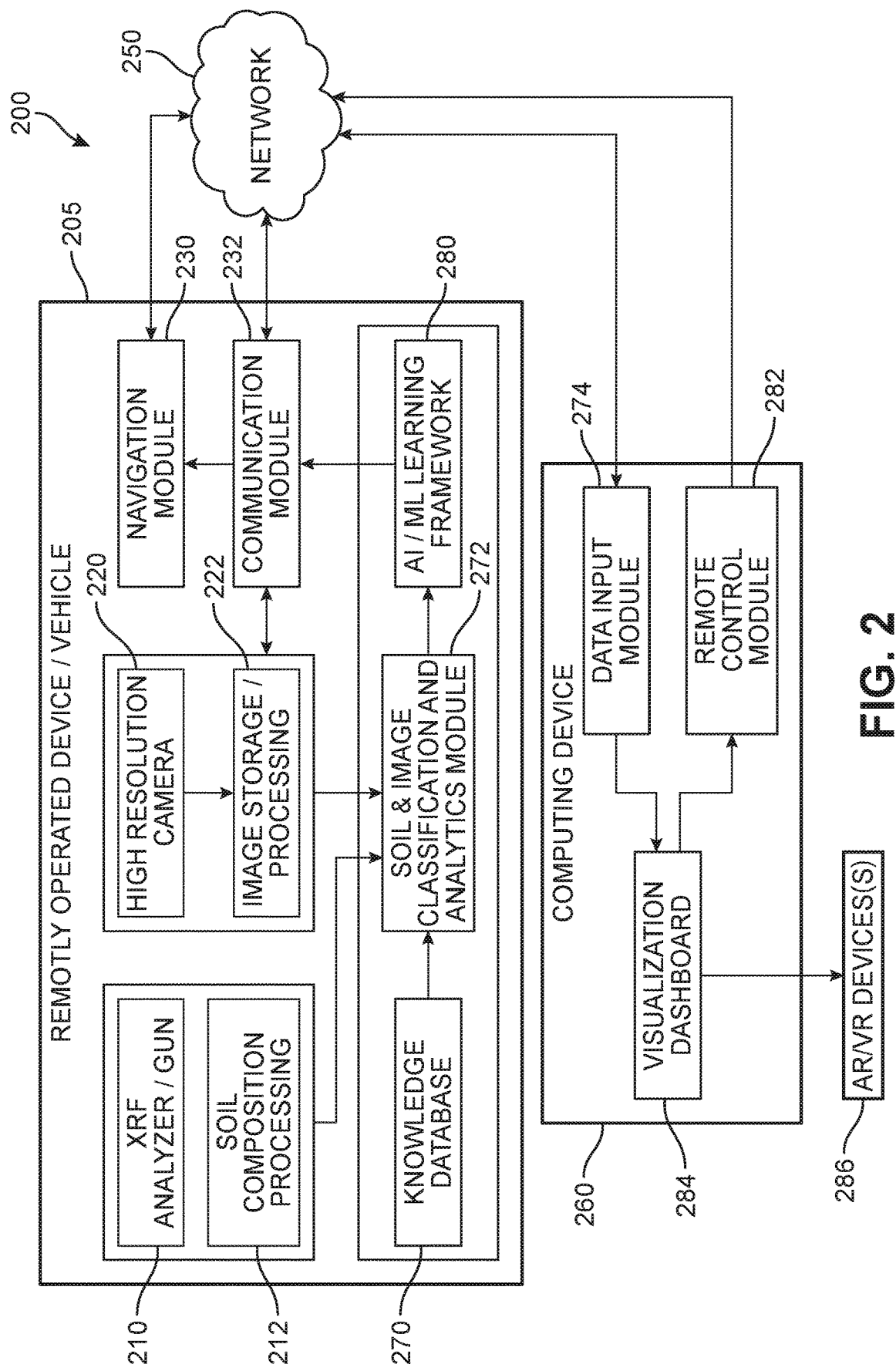
FIG. 2 is a schematic diagram of an embodiment of an architecture of an intelligent and autonomous mineral exploration system for area selection and target identification.

Referring now to FIG. 2, one embodiment of an intelligent and autonomous mineral exploration system architecture ("architecture") 200 for area selection and target identification is presented. Architecture 200 can include a plurality of interconnected components that leverage robotics, X-Ray Florescence (XRF) technology, image analytics, IoT enabled devices, and mobility platform to perform and facilitate exploratory mineral sampling. As illustrated in FIG. 2, the architecture 200 includes a remotely operated vehicular device or smart vehicle ("remote device") 205 configured to traverse through the exploration area and otherwise perform on-site operations. As a general matter, such a vehicle can be understood to include one or more onboard computing systems. The onboard computing system may comprise a single computing device, or a network of multiple computing devices, including one or more processors and memory such as a non-transitory computer readable medium. Instructions stored within memory may be executed by the one or more processors. The vehicle may also include one or more communication components, such as cellular network components for communicating over cellular networks, Wi-Fi components for communicating over Wi-Fi networks, and other communication components, as well as one or more vehicle sensors. In different embodiments, the onboard computing system(s) may be configured to communicate with one or more remote systems over a network, as described below. The network could comprise any wide area network, local area network or other suitable network. In some cases, network may be the Internet. The onboard computing system may communicate, for example, with one or more external database systems. An external database system can include a server (including processors and memory) and a database, and the external database system may store various kinds of information, including, but not limited to: navigation information, geospatial information, terrain conditions, weather information (including, for example, rain, snow, ice and/or flooding forecasts), as well as other kinds of information. It may be appreciated that onboard computing system may both send and receive information to and from these remote databases. Moreover, it may also be appreciated that in other embodiments, one or more of these databases (or parts of the databases) could be locally disposed within the remote vehicle device.

In some embodiments, commands and instructions from remote control module 282 of computing device 260 can be received across network 250 for controlling remote device 205 via a navigation module 230. In some cases, navigation module 230 includes a GPS receiver that can receive GPS information. In other cases, navigation module 230 can include other receivers capable of receiving global or local positioning information. Additionally, navigation module 230 may comprise maps and/or information from other kinds of geographic information systems (GIS) that can be used to generate navigation routes.

In different embodiments, the remote device 205 can include or utilize a sampling tool 210 that performs an elemental analysis of the surface being explored. Such a tool 210 can include any instrument configured to various material samples need to be analyzed for identification of elemental composition, molecular makeup, or mineral content, study of crystallization, evidence of stress and shock, and/or crystallite size and orientation distributions (i.e., crystalline texture). In some embodiments, an x-ray diffraction/x-ray fluorescence (XRD/XRF) instrument designed to characterize elemental composition and mineralogy from small fine-grained or powdered samples may be used. For example, the XRD/XRF instrument can include a broad-spectrum collimated X-ray source in a sensor head connected to a control system that can include control and readout electronics, processor(s), memory, power supply, and associated software, firmware, and/or hardware necessary to perform event processing for the collected data.

This data can then be output to an associated soil composition processing module ("soil processor") 212 configured to execute one or more instruction sets relating to event processing. In one embodiment, the soil processor 212 is able to generate coordinates as well as other x-ray data. For example, each x-ray event collected by tool 210 can be associated with a time (e.g., with resolution of the readout rate, typically seconds), position (e.g., X-position, Y-position), and energy value. The sample data can be analyzed by soil processor 212 whose results are used to identify possible mineral matches when compared to known values. Although the soil processor 212 is described in a singular form, the processor may comprise one or more processors in a multi-processing arrangement.

Furthermore, in some embodiments, the remote device 205 can further include a high-resolution imaging device ("camera") 220 to capture sample images as the remote device 205 moves through the designated area. Such images allow for the visual examination of a sample that is undergoing XRD and XRF analysis. For example, mineral identification is significantly simplified when optical characteristics such as color, reflectivity, and surface texture are also available. Optical imaging can further support precise and reproducible positioning of samples. An illumination source (e.g., LEDs, illumination rings, one or more light sources having different characteristics (e.g., ultraviolet light (UV-A, UV-B, UV-C), infrared, etc.) that may be utilized to provide enhanced analysis capabilities (e.g., fluorescence, phosphorescence, optically stimulated luminescence, triboluminescence, etc.) may be optionally provided to enhance optical imaging. The optical data is stored in and processed by an image storage and processing module ("image processor module") 222. Although the image processor 222 is described in a singular form, the processor may comprise one or more processors in a multi-processing arrangement.

As shown in FIG. 2, both the soil-based data generated by soil processor 212 and image data generated by image processor module 222 are transmitted to and received by soil and image classification and analytics module ("classification module") 272. The classification module 272 is configured to, among other thing, execute one or more image classification models built using Deep Learning Open Source Frameworks such as Python callable libraries and other Machine Learning Applications, including Convolution Neural Networks (CNNs) using TensorFlow, Keras, Microsoft® CNTK, OpenCV and/or Clarifai API, Custom Image Classification Models, or other similar techniques known in the art, including but not limited to Theano, Torch, Caffe, SciKit-Learn, Accord.NET, Spark MLib, Azure® ML Studio, Amazon® Machine Learning (AML), Google® Vision API, Image Processing and Computer Vision API (Microsoft® Azure), etc.

In some embodiments, the classification module 272 can refer to information provided by a knowledge database 270 which may be stored locally onboard the device 205 or alternatively via a cloud repository (accessed by device 205 via a network connection). The knowledge database 270 offers a reference by which classification module 272 can compare, identify, and quantify elements represented within an acquired spectrum (e.g., based on soil data and/or image data), and then match this elemental data against a list of mineral definitions with fixed elemental ranges stored in knowledge database 270. For example, classification module 272 can be configured to compare the acquired spectrum of an unknown mineral to a library of known mineral spectrums in knowledge database 270, and then identify the sample based on which known spectrum that is most similar to the sample's spectrum. In another example, classification module 272 can apply rules or criteria that, if met, classify the spectrum, typically applied in a "first match" manner, where the spectrum is compared sequentially to the criteria of each possible mineral, and when the spectra meets a criteria, the system assigns that element to the spectrum.

Such algorithms can rely on Image Classification models where the image is passed through layers (e.g., Convolution, Pooling, and Fully Connected) of algorithm for preprocessing, and can be used to identify salient information from the soil and image data. These models can be customized by an AI/ML learning framework 280 to allow for a best fit of data that is collected by remote device 205. For purposes of clarity, as an example, a first CNN layer can refer to a convolution layer representing the integral part that expresses the overlap of one function g as it is shifted over another function f, denoted by * sign: $[f*g](t)=\int_0^t f(\tau)g(t-\tau)d\tau$, where the first function f is a multi-dimensional array of inputs and the second function g is a multi-dimensional array of parameters to be adapted. This process is repeated in order to line up the feature of every possible image match, where values close to one are stronger matches, values close to negative one show strong matches for the photographic negative of the feature, and values close to zero reflect minimal or no match. A second CNN layer can refer to a pooling layer that is used to reduce the size of inputs and hence speed up the computations. The second layer includes stepping a small window across an image and taking the maximum value from the window at each step. This process preserves best fits of each feature within the window, and the result can reflect whether the target feature is present in an image. A third CNN layer can refer to a fully connected layer that serves as a primary building block of the traditional neural network. The data are treated as single list and all are treated identically. For example, high level filtered images can be translated into votes that are expressed as connection strengths between each value and each category. When a new image is presented it percolates through the lower layers until it reaches this layer at the end. Additional details regarding image classification will be provided with respect to FIGS. 7 and 8 below.

The output generated by either or both of classification module 272 and AI/ML learning framework 280 are conveyed to a remote computing device 260. For example, the output can be submitted to a communication module 232 of remote device 205 that is configured to provide data communication capability to an external processor or computer such as but not limited to a computing device 260 via network 250. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, one or more computing devices 260 can receive the processed soil and image data from remote device 205 via a data input module 274. Computing devices 260 include one or more devices capable of receiving, generating, storing, processing, and/or providing information, such as information described herein. For example, computing devices 260 may include a mobile phone (e.g., a smart phone, a radiotelephone, etc.), a laptop computer, a tablet computer, a desktop computer, a server, a virtual computer, a handheld computer, a gaming device, a wearable communication device (e.g., a smart wristwatch, a pair of smart eyeglasses, etc.), or a similar type of device.

The resultant output is further processed by a visualization dashboard platform ("dashboards") 284 to transform the data to a user-friendly presentation of information. The dashboards 284 may provide operators with user interfaces by which they can interact with the processed data, review raw data and applied classification models, and/or monitor events in real-time or near-real time. For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments, one or more dashboards may be presented via AR/VR device(s) 286. In other words, an end-user such as a geologist or other operator may view information through the manifestation of a dynamic, visual, and interactive virtual objects using an augmented reality (AR) enabled computing device. For example, the end-user may wear a head-mounted display (HMD) system (also referred to herein as smartglasses, smartgoggles, augmented reality (AR) glasses, or virtual reality (AR) glasses) or access and view a display for another computing device such as a mobile device that are configured to connect to a network and receive and transmit content for interaction with dashboard interface and/or remote control module 282, allowing for a significantly enhanced visualization experience that can increase data consumption and assimilation by the end-user, improving exploration efficiency, operations, and accuracy.

In FIG. 2 the knowledge database 270, classification module 272, and AI/ML learning framework 280 are shown in FIG. 2 as onboard device frameworks, such that communication between the modules does not require connectivity via any external network and synchronize internally. In some embodiments, the resulting output may also locally stored in an onboard database (not illustrated in FIG. 2) while the device 205 is operating remotely, and can be uploaded later to a secure cloud-based database periodically, or whenever network connectivity (network 250) is available. This approach allows the device 205 to operate in regions where there may be limited network connectivity (e.g., especially in hostile outdoor conditions). However, it should be appreciated that in other embodiments, one or more of these modules may be located remotely (e.g., accessible via a cloud server or linked to computing device 260), such that soil and/or image data is transmitted over network 250 and processed at an off-board location and/or in the cloud.

Figure 3:
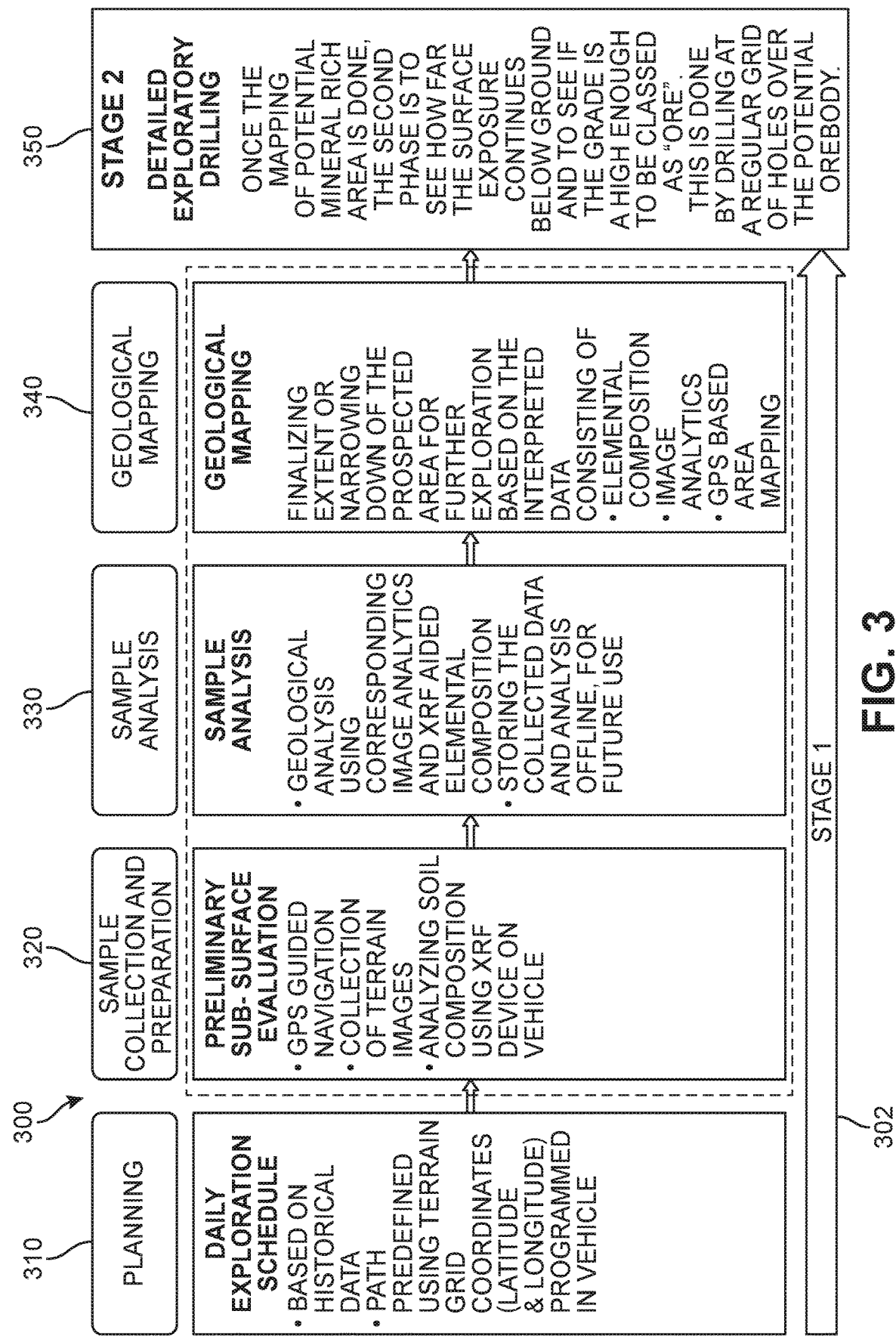
FIG. 3 is a schematic diagram of an embodiment of flow process of mineral exploration and discovery.

For purposes of clarity, a high-level flow process diagram 300 of one embodiment of the proposed methodology is presented in FIG. 3. A first stage 302 comprises four distinct levels. In a first level 310 ("Planning"), the daily exploration schedule is designed, based initially on historical data. The smart vehicle (e.g., "rover") will navigate through the terrain based on a grid described by a set or series of pre-programmed coordinates (latitude and longitude) that are received by the onboard computing system of the vehicle. Thus, once the selected path the vehicle should travel has been inputted by an operator, the vehicle can proceed to cover the target terrain with little to no manual supervision or follow-up. As noted earlier, the vehicle is equipped with a high definition camera, a portable XRF device, a navigation guidance system, and data transmission systems. This system can be contrasted to the conventional approach in which geologists must physically travel to the subject area for a visual inspection and relies on paper-based maps and the geologist's own intuition, experience, and understanding of the area.

In a second level 320 ("Sample Collection and Preparation"), the vehicle is directed towards the area which is under prospecting and exploration to determine whether there is a significant presence of any mineral based on GPS guided navigation. The vehicle moves through the selected terrain where images of the in-situ soil along with the XRF reading are captured over certain predetermined distance intervals. The vehicle will capture images for each location that corresponds to one of the GPS coordinates previously received by the onboard computer until the entire grid has been mapped. This level can be contrasted to the conventional approach in which the geologist will be on-site, physically inspecting the area for surface features and collecting samples manually using tools like geological picks, hammers, compass, inclinometers, and scoops to take back to his or her laboratory site. Furthermore, it can be appreciated that during a traditional field visit, an exploration geologist will collect an average of around 25 samples over an eight-hour period, providing an average data collection time per sample of around 20 minutes. The proposed system and method is far more efficient; for example, if the sample points are spaced 20 meters apart and the average speed of the vehicle rover is approximately one meter per second, the total time in navigating from one sample point to another is 20 seconds, while the time needed to trigger the XRF gun and capture readings is approximately 100 seconds, resulting in an average data collection time per sample of two minutes. This increase in sampling rate can lead to a profound reduction in labor costs and exploration time.

In a third level 330 ("Sample Analysis") the captured images and XRF data are analyzed locally (onboard the vehicle) using image analytics and soil classification techniques, and a determination of mineral content of the area and the resulting output is transmitted to the remote-control center and/or cloud database for secure storage. The areas which indicate significant presence of mineral content are then mapped for further detailed exploration. The collected data and analysis are stored offline for future reference. The data can be transmitted in near real-time for each point in the grid, to maintain a "live" or near-live map of potential ore rich sites during the exploration that is continuously updated in real-time or near-real-time. The processed data may be monitored by an operator located in the control room via the visualization dashboard, which may be presented through an AR/VR system in some embodiments, or through a user interface displayed on the screen of a computing device such as a desktop, laptop, tablet, or mobile phone. In contrast, conventional methods must await the physical return of the samples collected by the geologies for testing in the laboratory, to be organized and processed manually, for example by manual heavy techniques such as crushing and grinding, pulverization, and quantitative chemical analysis (e.g., titration) to determine elemental composition, and results for each point in the grid are only available after all data has been collected and the geologist has returned to the laboratory.

In a fourth level 340 ("Geological Mapping") the boundaries of the prospected area for future exploration are finalized based on the interpreted data, including elemental composition, image analytics, and GPS based area mapping that are performed substantially or entirely automatically, with little input from the geologist. In contrast, conventional methods rely heavily on mineral content determined using physical lab results and notes by the geologist regarding other geological features. Finally, once the mapping of potential area is complete, a second stage 350 ("Detailed Exploratory Drilling") can begin to determine how far the surface exposure continues below ground and to see if the grade is sufficiently high enough to be classed as "ore" by drilling across a regular grid of holes over the potential orebody.

Figure 4:
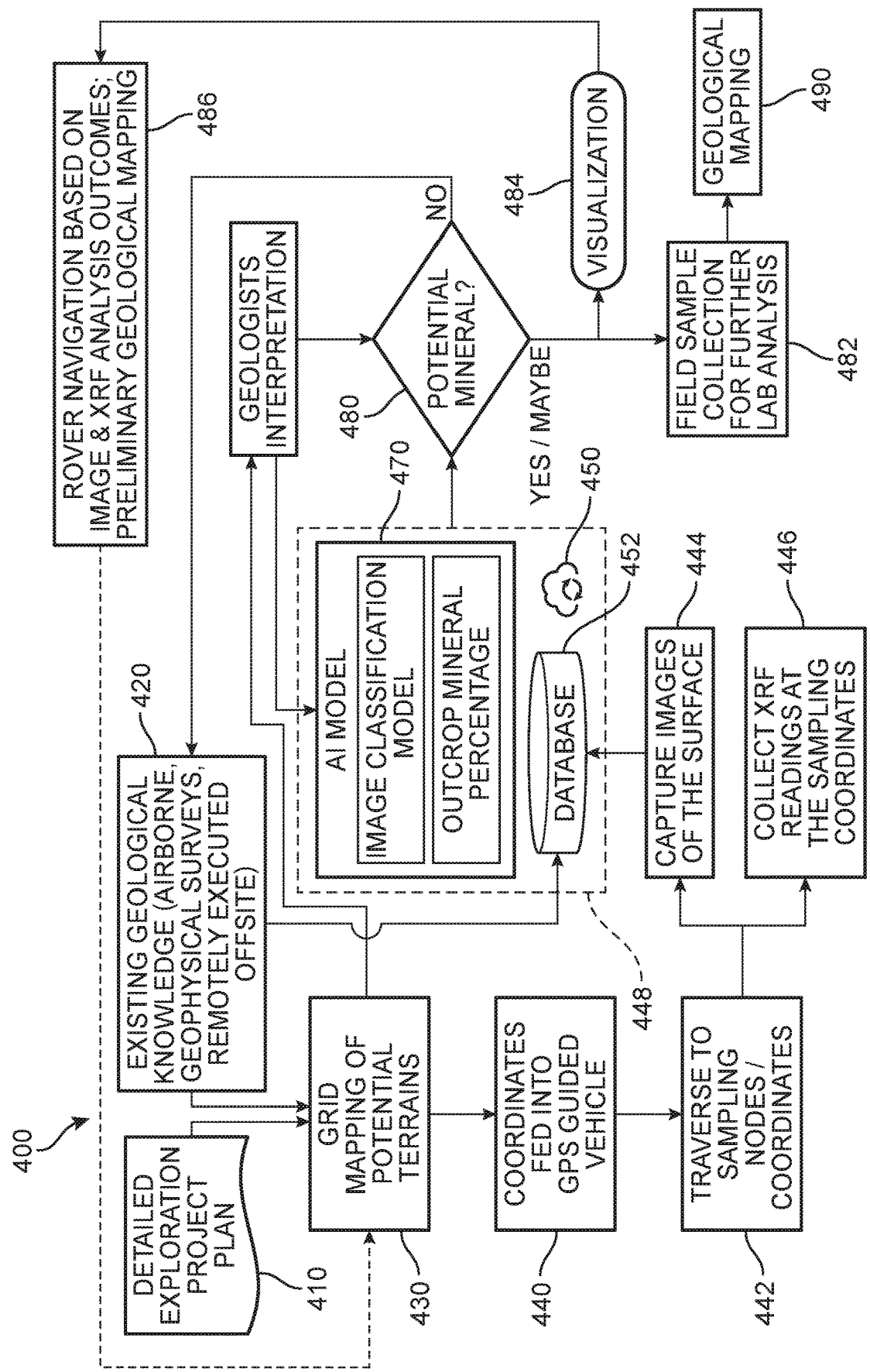
FIG. 4 is a schematic diagram of a functional architecture for mineral exploration, according to an embodiment.

Referring now to FIG. 4, an example of a functional architecture 400 for mineral exploration is presented. In FIG. 4, it can be seen that a detailed exploration project plan is created at a first step 410. In a second step 420, existing geological knowledge that may be pertinent to the potential target site is collected and reviewed, for example, during a flyover of the site, geophysical surveys, and remotely executed offsite research. This information is used to create an initial grid representing the mapping of potential terrains in an arrangement of sample target sites in a third step 430. During execution of the third stage 430, the proposed systems and methods may come into play during a sequence of substeps. In a first substep 440, the selected coordinates identified by the grid are fed into the GPS-guided vehicle, and the vehicle begins to travel to the designated coordinates in a second substep 442. As the vehicle arrives at each sample site, images will be captured of the surrounding surface in a third substep 444 and XRF readings will be taken in a fourth substep 446.

The collected image and XRF data are conveyed to a database 452 in a fifth substep 448. The database 452 can be located remotely and accessed via a network 450 in some embodiments, while in other embodiments, the vehicle may instead or also include a memory module where data is stored in a local database. The database transmits data to an AI model 470 to perform image classification as well as generate an estimated outcrop mineral percentage. In some embodiments, a geologist can review the processed data and/or the grid map in a fourth step 460 and provide feedback to the AI model 470 to ensure high, reliable volumes of accurate and precise data capture as the AI model is continuously trained and re-trained. The model can also correlate the image to its probable mineral composition, eliminate or significantly reduce outliers. The geologist can input this feedback into the AI model in real-time, while the vehicle continues to capture data, allowing for in-the-moment path optimization, where coordinates and mapping can be revised during the exploration excursion. The results of the AI model will support a determination as to whether a mineral is potentially present at the target site in a fifth stage 480.

Once the vehicle returns to the control site, any collected samples designated for further analysis can be submitted to the laboratory in a sixth stage 482. During this time (as well as during the vehicle excursion), data can also be presented to the operator via a visualization dashboard in a sixth substep 484. The area will be tagged and mapped comprehensively using the generated information in a seventh stage 490 to provide quality information pertinent to geological feasibility for the sampled terrain, and narrowing the potential target area that will be identified for further exploration. In addition, subsequent vehicle navigation routes can be modified or customized based on the collected image and XRF analysis outcomes as route navigation feedback to modify remaining preliminary geological mapping plans, in a seventh substep 486.

Figure 5:
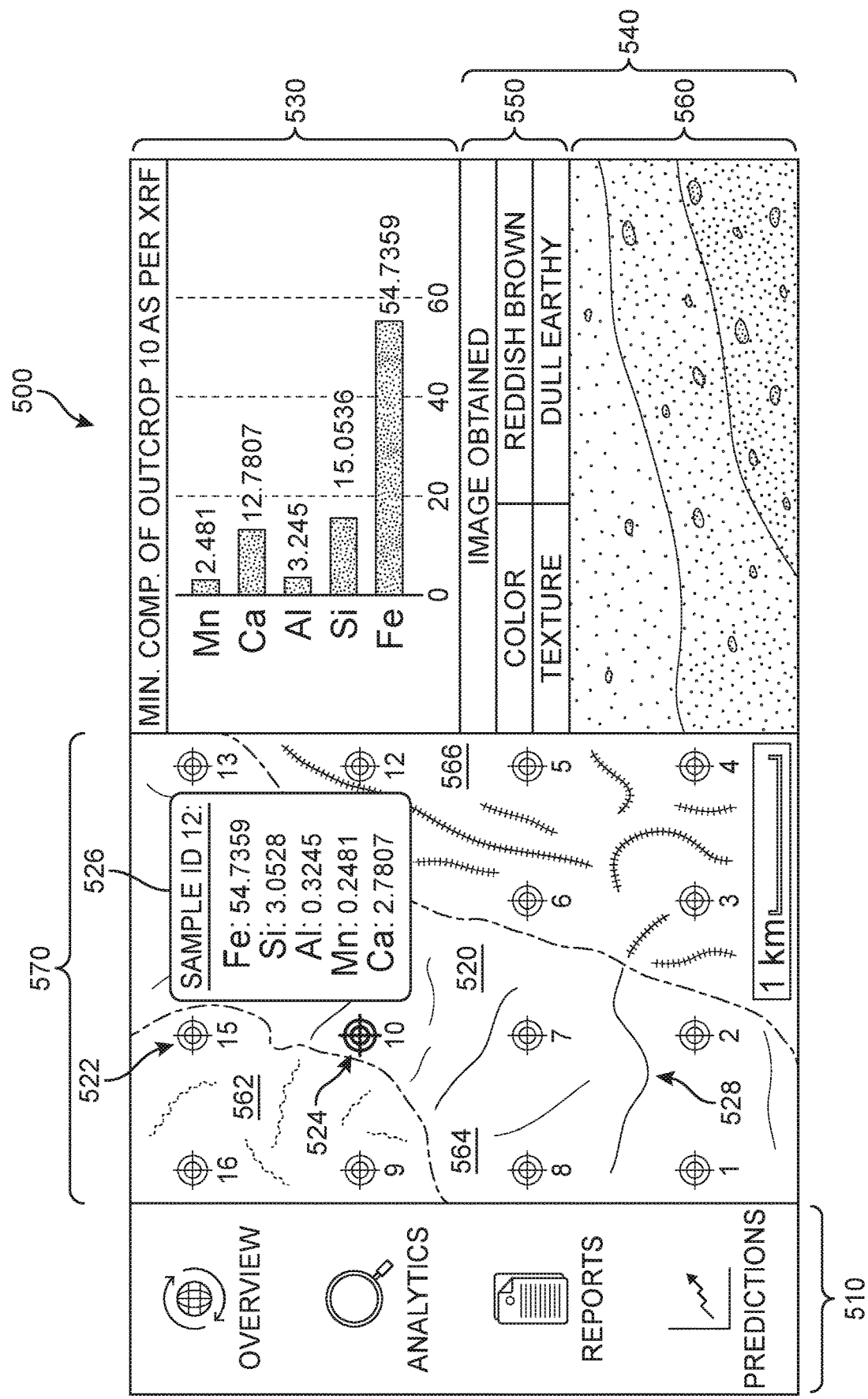
FIG. 5 is a visualization dashboard user interface for mineral exploration, according to an embodiment.

One example of a visualization dashboard user interface ("dashboard") 500 is presented now in FIG. 5. It should be understood that the dashboard 500 is only one possible depiction of a user interface that may be offered to the end-user, and in other embodiments, any variation in presentation style, options, menus, and graphical depictions can be used, including interfaces customized by the end-user to display the desired information. A Settings option can also be displayed to allow the end-user to create or modify the account. In addition, a number of interface layer options may be provided. For example, a navigation menu 510 can allow the user to switch to an Overview or landing page that presents a brief summary of the selected exploration session and satellite imagery of the subject area along with tasks and alerts. For example, this page may include details such as the Vehicle ID or Name (or an option to select a different vehicle), the type or model of XRF used by this vehicle, a list of tasks that are pending or scheduled for the selected session or vehicle (e.g., "Create workorder for vehicles that require maintenance", "Move the vehicle to the specified location for exploration", "Increase the limit of fixed number of images to be captured while performing the exploration activity", "Scheduled vehicle downtime in 24 hours", etc.), and/or a list of alerts (e.g., "Connectivity issues with Vehicle RVR05", "Vehicle RVR07 is deviated from the targeted path", etc.).

The current view shown in FIG. 5 is an analytics layer, and includes a terrain grid overview 570 depicting an image (e.g., a satellite image) of a portion of a target region 520 that has been selected for exploration. The terrain grid overview 570 may show the target region in its entirety, or simply a portion of the selected target region. The target region 520 includes a plurality or group of target sample sites 522 (here shown as a grid of "crosshair" icons overlaid on the image) that each represent one coordinate set pinpointing a single target sample site in the target region. In this case, a smaller portion of a target region with only 16 sites is shown for purposes of simplicity. In some embodiments, the interface is configured to receive inputs from the end-user; for example, selection of a particular target 524 ("Target 10") can trigger presentation of additional information panel 526 or data associated with the selected site. In this case, additional information panel 526 includes a 'popup' message or interface identifying the Sample ID, and listing the estimated mineral composition that has been determined for the selected site. In some embodiments, this information can be also or alternatively presented via graph form, as shown in a first window 530, which is a bar graph representing the approximate mineral composition amounts of the selected site resulting from the XRF readings.

In some embodiments, a target region area can be segmented into a plurality of subregions for purposes of classification and navigation. For example, in FIG. 5, the target region 520 includes a plurality of subregions. For purposes of illustration, these subregions are divided from one another by dotted lines that have been overlaid on the grid. In this case, the target region 520 includes three subregions, comprising a first subregion 562, a second subregion 564, and a third subregion 566. A subset of target samples sites (coordinate sets) from the larger group of target sample sites 522 can be understood to be located within the boundaries of each subregion. In this example, the first subregion 562 in FIG. 5 includes a first subset comprising three coordinate sets (labeled 9, 15, and 16), second subregion 564 includes a second subset comprising eight coordinate sets (labeled 1, 2, 7, 8, 10, 13, as well as sites 11 and 14 presently hidden behind additional information panel 526), and third subregion 566 includes a third subset comprising five coordinate sets (labeled 3, 4, 5, 6, and 12). As will be discussed in greater detail below with reference to FIG. 9, in some embodiments, each subregion can be approached by the vehicle as representing differing mineral exploration goals and/or navigational data and guidance that may be modified in real-time (e.g., either by a remote operator or autonomously by the vehicular system) during an exploration session.

Furthermore, in some embodiments, a second window 540 can present salient imagery 560 for the selected site, as well as characteristics automatically identified based on the images captured for the site and image classification models. For example, for each image, the platform may indicate its assessment 550 of one or more qualities of the mineral, such as Color ("Reddish Brown") and Texture ("Dull Earthy"). Such a display of elemental composition, image, color, and texture, etc. can aid in categorization of the selected sample point. Some additional geological categories that may be evaluated by the system are discussed with respect to FIG. 6 below.

As another example, the dashboard 500 can include a Reports layer option which can present a summary, as well as reports of actual versus planned number of collected samples, number of images captures, area covered, and other pertinent information. In some embodiments, some or all of these reports can be presented in graphical form, such as bar graphs, line graphs, pie charts, cartesian graphs, percent complete indicators, etc. This information can be viewed or narrowed by, for example, date, time, shift, status, region, mineral category, and/or vehicle ID.

Similarly, in some embodiments, the dashboard 500 can include a Predictions layer option that will automatically generate the estimated best geological mapping per the results obtained for the subject area to promote insightful decision making. For example, the dashboard can include an estimated likelihood that the current terrain represents a viable mineral collection site with a specific deposit direction prediction and area (e.g., length×width) that has been determined to represent viable drilling sites. The dashboard may also provide high-level observations including but not limited to the mineral outcrop type(s) discovered, the dominant element, any associated or other formations present, and/or other data describing the mapped site.

Figure 6:
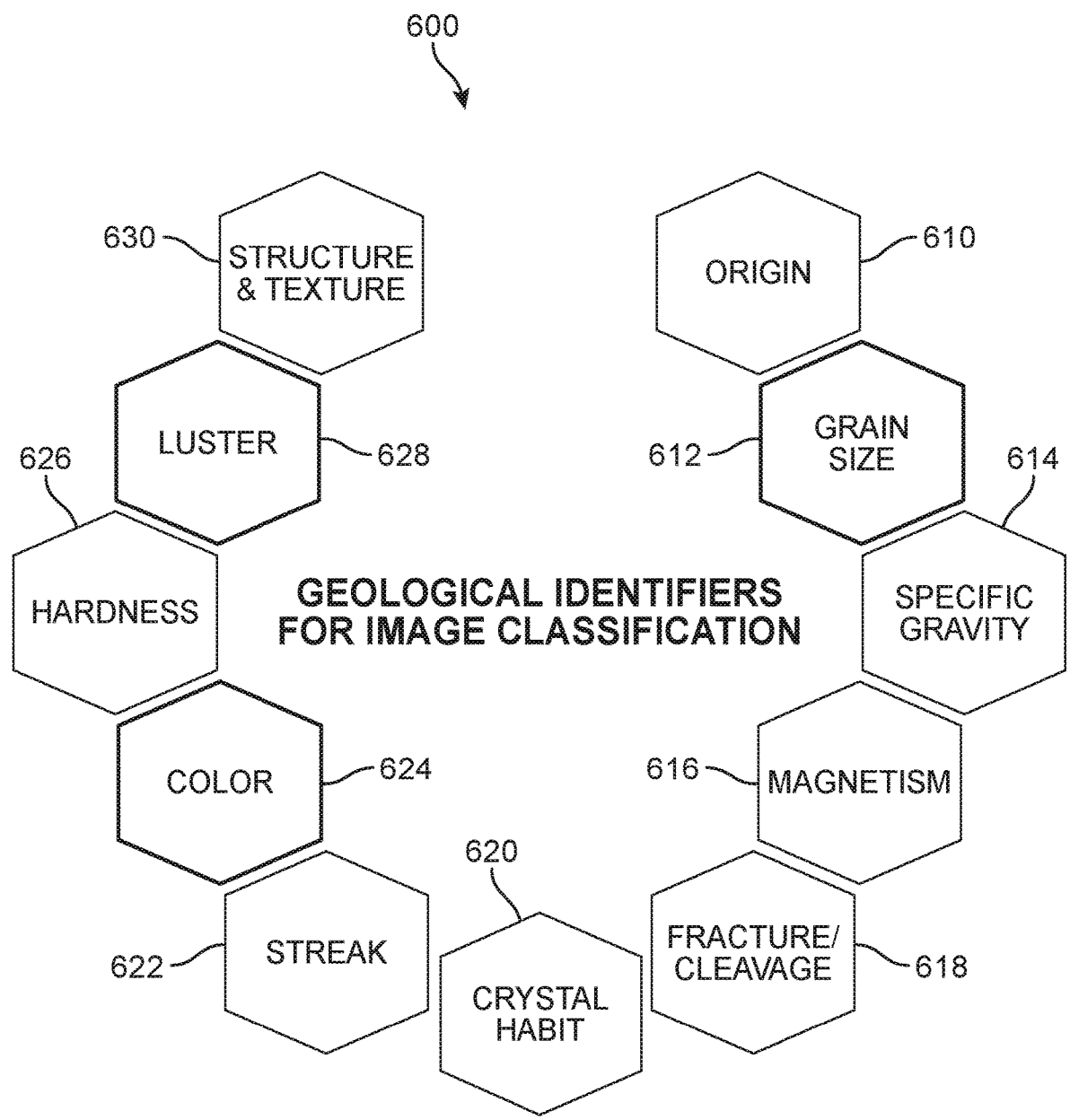
FIG. 6 is a schematic diagram depicting a plurality of geological identifiers that may be implemented by the proposed system, according to an embodiment.

Referring now to FIG. 6, for purposes of reference, an array of geological identifiers 600 (i.e., physical properties) that may be used by the image classification model to identify mineral composition is presented. A first identifier category ("Origin") 610 refers to whether a mineral is Igneous, Sedimentary, or Metamorphic, and a second identifier category ("Grain Size") 612 refers to whether the mineral is fine, coarse, rounded, jagged, banded, or non-banded. In addition, a third identifier category ("Specific Gravity") 614 refers to a ratio of a particular mineral's mass to that of mass of an equal volume of water and a fourth identifier category ("Magnetism") 616 refers to the ability of the rock to attract metallic objects. A fifth identifier category ("Fracture/Cleavage") 618 describes the way a mineral breaks, and a sixth identifier category ("Crystal Habit") 620 refers to the commonly found shape or form of the mineral, such as Prismatic, Tabular, Acicular, or Fibrous. A seventh identifier category ("Streak") 622 refers to the color left behind when the mineral is finely crushed, while an eighth identifier category ("Color") 624 refers to the color of the mineral, such as reddish-brown (Hematite), green (Olivine), violet (Amethyst), etc. In addition, a ninth identifier category ("Hardness") 626 is measured on the 10-point Mohs scale, a tenth identifier category ("Luster") 628 refers to whether a mineral is Metallic, Submetallic, Adamantine, Glassy, Resinous, Waxy, or Pearly, and an eleventh identifier category ("Structure and Texture") 630 refers to the size, shape, and arrangement of the grains or crystals, as well as the extent of homogeneity (i.e., uniformity of composition throughout). The descriptor concepts identified for each category above should be understood to serve primarily of examples, and non-limiting. For example, concept names or labels may be customized for the particular mining operation, or include additional labels in some cases and fewer in others.

One or more of these identifier categories can be fed into the image classification model as a basis by which the model may determine an identity of the mineral(s) present in a captured image. While a wide range of physical properties may be utilized by the system as identifier categories (see FIG. 6), it may be appreciated that the image classification model may offer greater accuracy when relying on physical properties that are more readily discernable through images. In other words, in seeking to remotely identify minerals, in order to classify certain physical properties of the mineral, the collection of physical or tangible samples may be required for testing for physical properties of the samples. For example, while some physical properties might be better detected based on XRF information or other laboratory-type analysis (e.g., such as origin or specific gravity or magnetism), the image classification model can provide a more reliable and accurate assessment when the primary identifiers selected take into account the type of data (imagery) which is being processed.

Three strong primary identifiers can include Grain Size, Luster, and Color. These three categories or geological features can be used to identify a mineral that may be present in a sample image, along with corresponding XRF information for the sample. Additional or alternate identifiers can also be incorporated into the model, for example depending on the target area and historical factors. Two parameters can be fed as inputs into the model, including image data captured from the vehicle onboard camera, of a sufficiently high resolution so as to identify accurately (for purposes of this example) the grain size, color, and the luster of the surface, as well as the sample reading or identifying soil information from the XRF instrument. The three selected identifiers (Grain Size, Luster, and Color), when incorporated into the image classification model as distinct, powerful models of their own, have been shown to produce, on average, classifications with significantly greater accuracy and reliability. In other words, while certain physical properties are not easily ascertained without more tangible data or physical inspection, there are three physical properties in particular that can be more readily determined based only or primarily on image-based data for that mineral. In addition, by selecting all three identifiers (Grain Size, Luster, and Color), results are significantly more reliable as the system is able to compensate for varying image capturing conditions at the potential extraction area or site (e.g., shaded areas with poor light, excessively bright areas, smaller visible surface area, etc.) by integrating results across three models. In other words, even if one of the three identifier models fails to classify the mineral with the desired degree of accuracy, the remaining two identifiers can compensate for the missing or unreliable data and continue to generate appropriate results.

Previously collected image libraries can be imported and image classification models (such as Clarifai) can be used to classify the color, grain size, and texture respectively from collected imagery. The image classification model can be created by reference to the database of images of various minerals and accompanying classifications. One or more concepts (i.e., descriptive labels) are generated by the CNN with corresponding attributes that will be used to train the image classification model. The model can be evaluated and iterations repeated until the confidence level reaches a satisfactory threshold (e.g., greater than 90%). For purposes of this example, three separate models may be built by this process, referred to here as (a) Model_color to classify the color of the outcrop in the image; (b) Model_grainsize to classify grain size of the outcrop in the image; and (c) Model_luster to classify the luster of the outcrop in the image. In addition, concepts for each of the respective models are created to define the model such as white, black, red, green, blue, etc. for Model_Color, fine, coarse, banded, etc. for Model_grainsize, and metallic, sub-metallic, banded, etc. for Model_luster. The three models are then trained with relevant images for respective concepts, and then each model is evaluated and tested with the real-time images captured by the vehicle.

Figure 7:
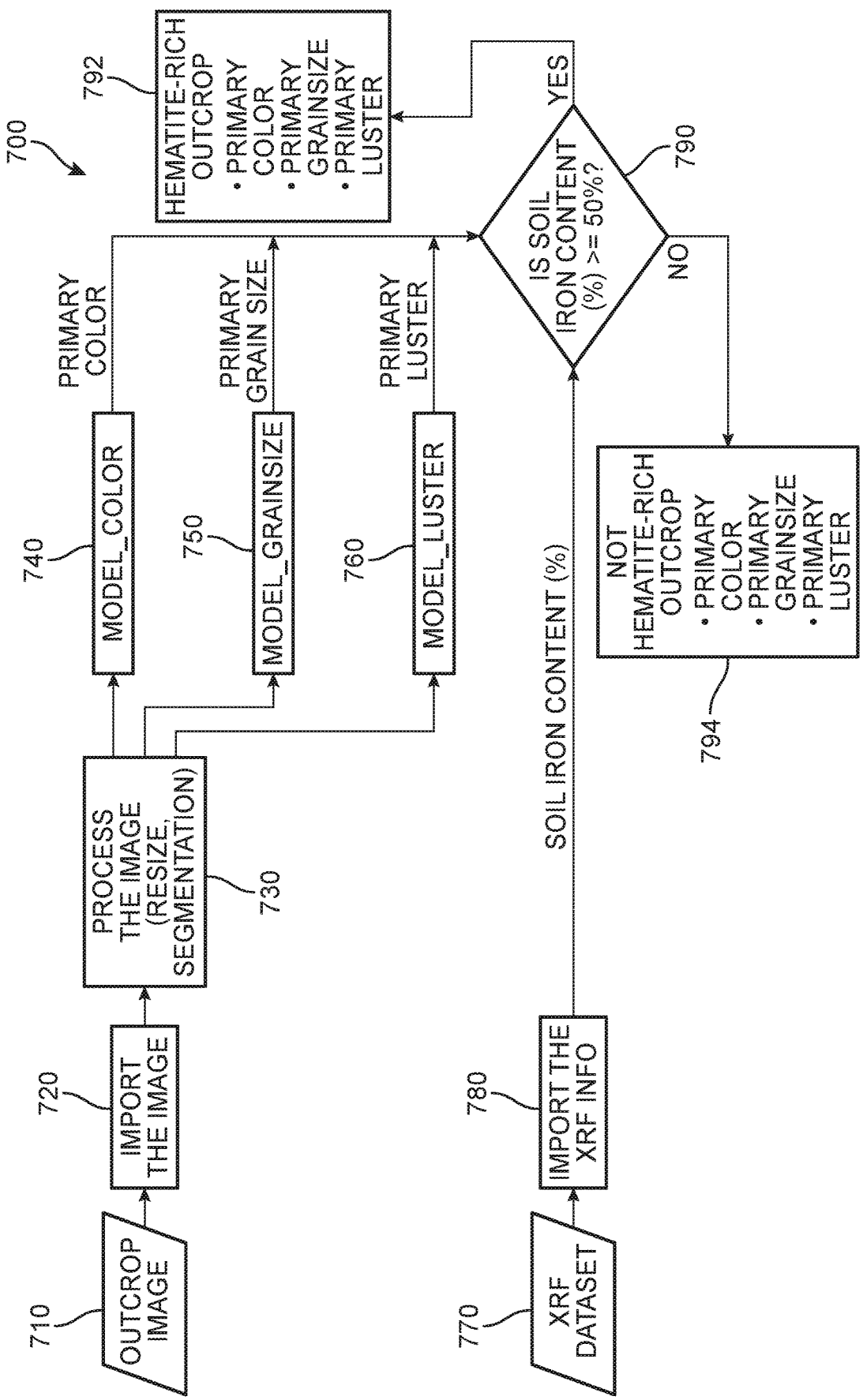
FIG. 7 is a flow diagram of a process of image classification incorporating three distinct model types, according to an embodiment.

For purposes of clarity, a flow chart depicting an example of the image classification process 700 implementing these three models is shown in FIG. 7. In this example, two data inputs are fed into the system, including one or more outcrop images 710 and an XRF dataset 770 corresponding to a sample taken from soil captured in the outcrop image 710. In a first stage 720, the image(s) 710 are transferred to the control site and stored in a server. For example, the image(s) can be stored in a table in a database against a unique ID for later reference. In a second stage 730 one or more image(s) are selected and imported from the database table in the code, for example based on the unique ID. In a third stage 740, the imported image(s) are pre-processed; for example, the imported images can be re-sized to a uniform size such as 600×400 pixels or other sizes. The resized image can also be segmented into a plurality of segments for better resolution (e.g., each image can be segmented into 2, 4, 6, or more segments). Each segment of the resized images can then be passed through the three separate models.

Figure 8:
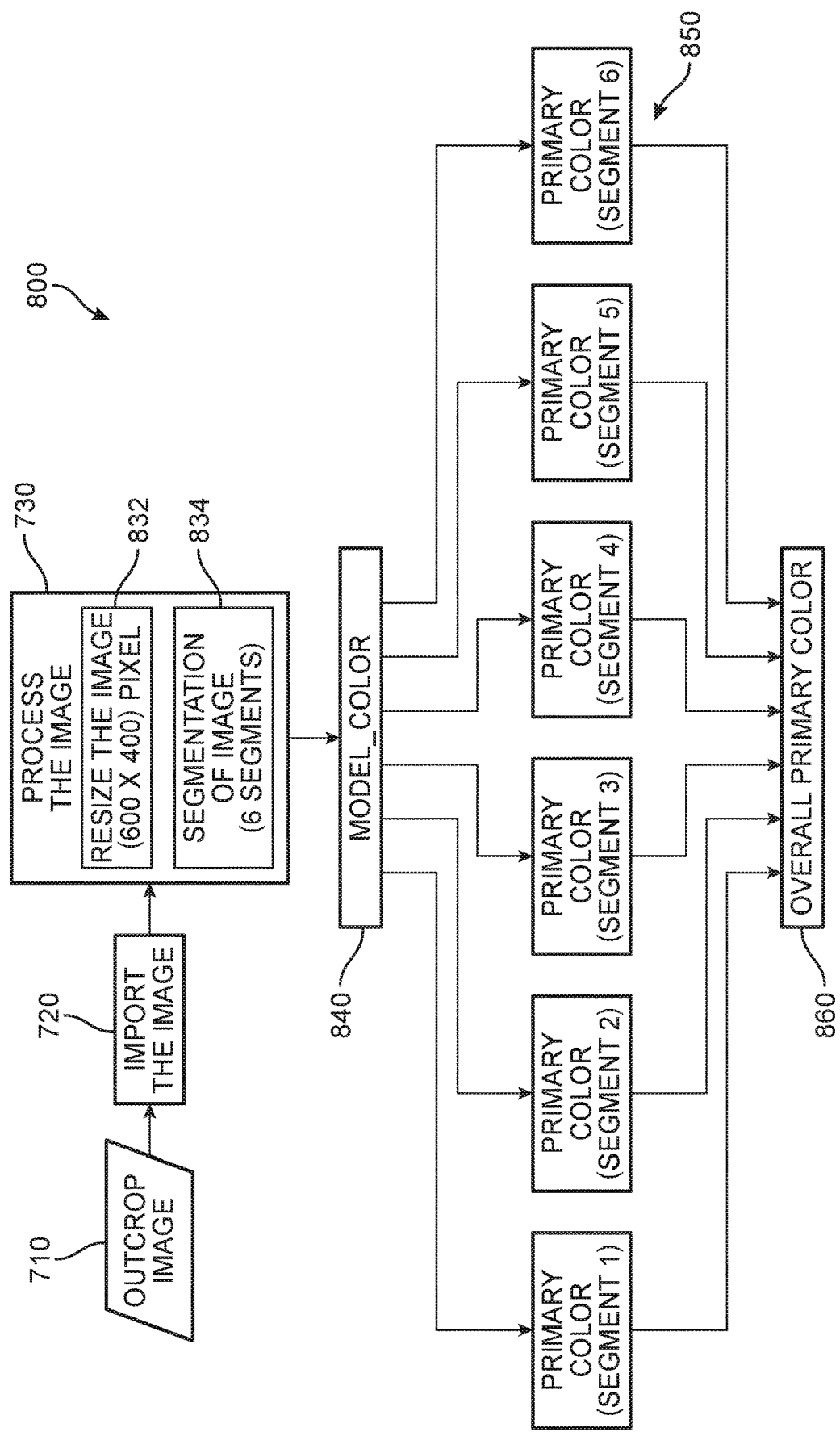
FIG. 8 is a flow diagram depicting a model configured to automatically identify a physical property from an image, according to an embodiment.

Referring to FIG. 8, an example of one specific model implementation is presented to better illustrate the flow described. In FIG. 8, the application of the model_color image classification is depicted. Thus, once the image 710 is imported, and processed (resized 832 and segmented 834), the resultant segmented data can be passed into color image classifier 840 implementing the model_color. For example, the image classification system can call the trained model_color within the code using its unique API key. Each segment of the image is then evaluated individually. In this case, for each of the six segments for image 710, a primary color is identified in concept classification stage 840. This concept (a color name) is selected based on the highest confidence percentage for each segment in a data frame and stored. The means for confidence percentage(s) of all six segmented parts of the original image are calculated and then grouped by the concept outcomes based on the mean of their predicted value and sorted in descending order. The concept outcome with highest confidence percentage can be selected as the Primary Color in an outcome stage 860 and generated as an output by the model.

Returning now to FIG. 7, this results in a determination of a primary color following the implementation of model_color 740. It can be appreciated that the general process described with reference to FIG. 8 may also be applicable to the remaining two models as well. Thus, implementation of model_grain size 750 results in a determination of the mineral's grain size, and implementation of model_luster 760 results in a determination of the primary luster of the mineral.

For example, for the model_grain size 750, the image classification system will call the trained model_grainsize within the code using its unique API key, and each segment of the image will be evaluated individually. The concept (a value describing the grainsize) with the highest confidence percentage for each segment in a data frame will be selected and stored, and a mean on confidence percentage(s) of all six segmented parts of the original image calculated, then grouped by the concept outcomes and sorted in descending order. The concept outcome with highest confidence percentage is selected as the Primary Grain Size and generated as an output by the model.

Similarly, for the model_luster 760, the image classification system will call the trained model_luster within the code using its unique API key, and each segment of the image then evaluated individually. The concept (a value or label describing the luster) with the highest confidence percentage for each segment in a data frame will be selected and stored, and a mean on confidence percentage(s) of all six segmented parts of the original image calculated, then grouped by the concept outcomes and sorted in descending order. The concept outcome with highest confidence percentage is selected as the Primary Luster and generated as an output by the model.

The algorithm will then select the concept with highest mean value from each of the three models for its final classification. In what can be a parallel process, or one that can occur at a different time, the XRF dataset 770 will also be imported 780. One or more mineral characteristics (e.g., iron content) can be measured in a soil analysis stage 790 and used to further support or narrow the identification to a more specific mineral type. For example, in this case, the concepts identified indicate that the mineral is Hematite. The soil analysis can add important information to this classification, such as whether the outcrop is hematite rich 792 or not hematite rich 794. The solution can be extended to include other minerals such as Aluminum, Silicon, Calcium, Manganese, and others.

Figure 9:
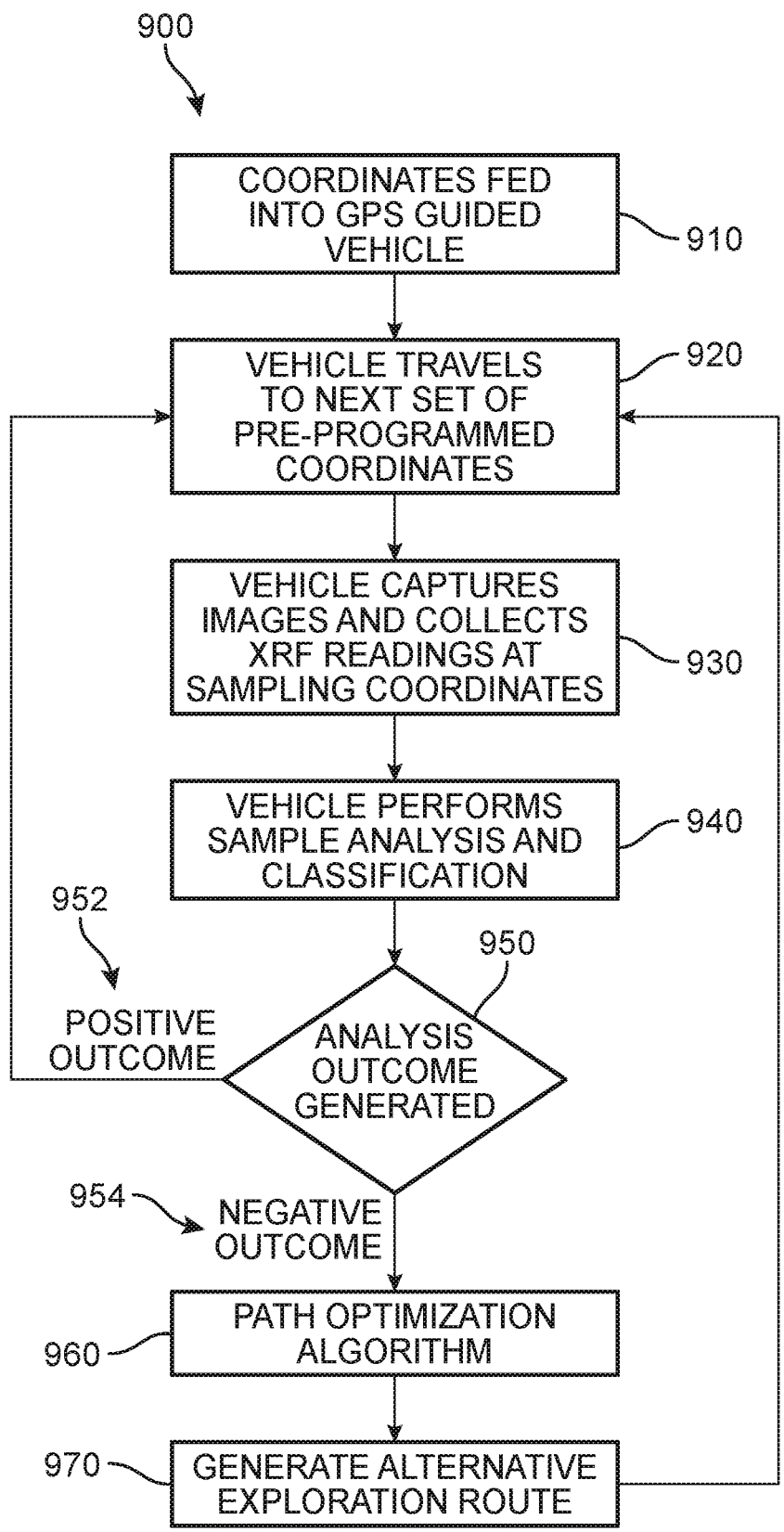
FIG. 9 is a flow diagram depicting a process of automatically implementing path optimization.

In some embodiments, the proposed system can include provisions for real-time optimization of the route taken by the vehicle during its mineral exploration. FIG. 9 presents a flow diagram providing an example overview of such an approach. In FIG. 9, during a first stage 910, an operator manually programs or otherwise inputs the desired sets of GPS-based coordinates. This series of coordinate sets will guide the vehicle's journey through a particular terrain or region ("target region"), where each set of coordinates represents a designated sample site where data is to be collected. In different embodiments, the target region can be segmented or demarcated into multiple subregions, where each subregion includes or encompasses a smaller group of coordinate sets. In other words, a large group or set of coordinates inputted by an operator will collectively represent a single target region. However, this larger group of coordinates can be further partitioned into several distinct "sub-groups" or "subsets", with each subset including a smaller series of coordinates that correspond to a particular subregion within the target region. Depending on how the partitioning of the target region occurs, these subsets can each include an equal number of coordinate sets, or the number of coordinate sets can vary widely. In other words—simply for purposes of illustration—a target region might include a sequence of 200 sets of coordinates that have been identified for exploration. This target region can, for example, be partitioned into four subregions, where a first subregion is associated with or include a series of 50 coordinate sets (comprising a first coordinate subset), a second subregion similar in area to the first subregion can be associated with or include a series of 50 coordinate sets (comprising a second coordinate subset), a third subregion smaller than the second subregion can be associated with or include a series of 26 coordinate sets (comprising a third coordinate subset), and a fourth subregion larger than the second subregion can be associated with or include a series of 74 coordinate sets (comprising a fourth coordinate subset). In other words, target regions can be divided into any number of subregions, and each subregion can include any number of sites designated for exploration by the vehicle. The numbers in this example are provided for purposes of illustration only, and it should be understood that the coordinates inputted by an operator can differ widely based on the operator's desired goals.

Once the vehicle has received the pre-programmed series of coordinate sets, it can identify a route that will traverse to each of these points (i.e., each coordinate set) and initiate an exploration of these sites in a second stage 920. The vehicle will travel to the first sample area or site and capture data at this site in a third stage 930, including XRF readings and images, as described above in greater detail. The vehicle system then analyzes the collected data to estimate the mineral contents available at this sample site in a fourth stage 940. Based on this analysis, the system determines in a fifth stage 950 whether the detected mineral composition includes the desired mineral(s) (e.g., based on XRF data) and the desired amounts or proportions of said minerals (e.g., based on image classification decisions discussed previously) to designate the current sample site as representing a potential ore zone (i.e., a site that likely has the desired mineral resources). Such a designation will be referred to herein as a "positive outcome" 952. The generation of a positive outcome then prompts the system to continue on its original course, repeating the stages 910, 920, 930, 940, and 950 as shown in FIG. 9.

In different embodiments, the parameters used by the system to determine whether a positive outcome should be generated can be selected or inputted by the operator and can be adjusted or customized for each vehicle exploration session and/or the requirements of the operator. In some examples, the operator can require that one or more (or all) of the identifiers (see FIG. 6) that are being evaluated meet a minimum threshold or measurement. As one non-limiting example, the operator may establish a 50% threshold for the system in determining whether the sample site is a potential ore zone. If, on the other hand, the detected mineral composition is deemed insufficient (i.e., below the required threshold) for further use, the system may generate a negative outcome 954. However, in other cases, a lower threshold (under 50%) or a higher threshold (greater than 50%) may be desirable.

In some embodiments, in response to a negative outcome, the system can be configured to trigger a separate sequence or process. It should be understood that while FIG. 9 presents an embodiment in which a single negative outcome triggers such a sequence, in other embodiments, the system can be configured to trigger this process only if the system has generated a negative outcome for two or more consecutive sample areas or sites. In other words, in one embodiment, the system can be configured to continue on the original route unless a negative outcome is obtained "X" consecutive times. For example, the operator may instruct the vehicle to remain on its previous course unless a negative outcome occurs five consecutive times. In such an example, the vehicle may determine the first sample site is positive, thereby continuing its original route. Similarly, if the vehicle then determines that the second sample site is negative, it will also continue on its original route. However, if the next four sample sites are also assigned negative outcomes (producing five consecutive negative outcomes), the vehicle will proceed with the alternate process, beginning at a sixth stage 960. In contrast, if any of the next four sample sites following the second sample site (i.e., the third sample site, fourth sample site, fifth sample site, and sixth sample site) had been assigned a positive outcome, the counter would reset.

In different embodiments, the number of consecutive negative outcomes that must be obtained can be manually set by the operator, and/or can correspond to an overall percentage of a subregion. For example, where a first subregion included 20 sites or sets of coordinates, and the vehicle has thus far explored 12 of the 20 sites, the vehicle might have obtained 8 positive outcomes and 4 negative outcomes, providing an overall positive percentage or rate of 66.7% for that subregion. The operator may have requested that the vehicle continue on its original course as long as the overall positive outcome percentage remains above 50% (though any other threshold may be used, as noted above). In this example, as the vehicle continues along its route through the first subregion, but subsequently obtains five consecutive outcomes that are negative, and the overall positive percentage will change. Specifically, the total number of explored sites is now 17, in which the vehicle obtained 8 positive outcomes and 9 negative outcomes, providing an overall positive outcome percentage of 47.05%, which falls below the threshold identified (50%) established by the operator.

In response, the system can trigger an optimization sequence (represented by sixth stage 960 and seventh stage 970) whereby the current route is altered to enable the vehicle to skip or bypass the remaining sites within that particular subregion. In other words, the system will now automatically determine or calculate the best route, based on distance and terrain, from the site for which the fifth consecutive negative outcome was obtained to the closest unexplored site in the next closest unexplored subregion. In FIG. 9, the route is modified in seventh stage 970, such that the next stop on the vehicle's journey will occur in a different subregion of the target region, and exploration will continue from there as per first stage 910. Thus, while the vehicle generally adheres to the original set of coordinates during its travels, it can be configured to automatically and intelligently respond to a detection of mineral content that falls below a desired threshold. In this case, the response implemented by the onboard system allows the vehicle to skip the exploration of the remainder of a particular subregion if the previous samples for that subregion were found to represent an insufficient amount of the desired mineral composition. This decision occurs in real-time, significantly increasing the efficiency of the vehicle's output and use of computing resources. In addition, in some embodiments, the vehicle can be configured to generate alternative coordinates in real-time based on its own analysis that vary from the original pre-programmed group of coordinates if it appears that a different site might include a mineral composition that aligns with the exploration goals.

Figure 10:
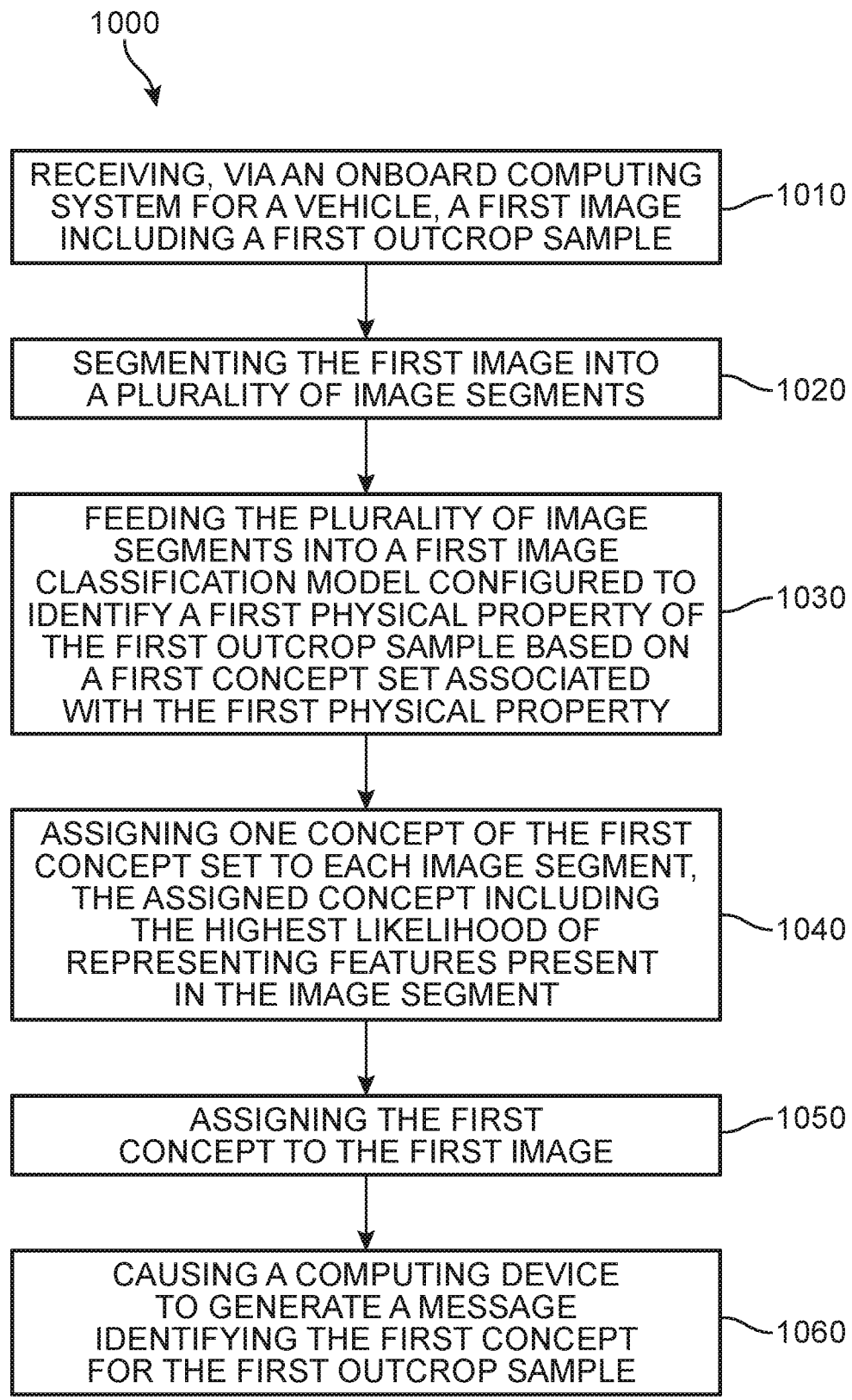
FIG. 10 is a flow chart depicting a method of identifying viable areas for mineral extraction, according to an embodiment.

FIG. 10 is a flow chart illustrating an embodiment of a method 1000 of identifying areas for mineral extraction. As shown in FIG. 10, a first step 1010 of the method 1000 includes receiving, via an onboard computing system for a vehicle, a first image for a first potential extraction area, the first image including a first outcrop sample, and a second step 1020 of automatically segmenting the first image into a plurality of image segments that includes a first image segment. The method 1000 also includes a third step 1030 automatically feeding the plurality of image segments into a first image classification model configured to identify a first physical property of the first outcrop sample based on a first concept set associated with the first physical property. In addition, a fourth step 1040 includes automatically assigning one concept of the first concept set to each image segment, the assigned concept including the highest likelihood of representing features present in the image segment, wherein an assignment of a first concept to the first image segment has a confidence value greater than confidence values for concept assignments to the remaining image segments of the plurality of image segments. A fifth step 1050 of the method 1000 includes automatically assigning the first concept to the first image, and a sixth step 1060 of causing a computing device to generate a message identifying the first concept for the first outcrop sample.

In other embodiments, the method may include additional steps or aspects. For example, the method can further include steps of receiving X-ray fluorescence (XRF) data for the first outcrop sample, calculating an elemental composition of the first outcrop sample, and causing the computing device to present a summary of the elemental composition of the first outcrop sample. In one embodiment, the first physical property is one of a color, grain size, texture, origin, specific gravity, cleavage, crystal habit, streak, hardness, and luster. In some cases, the method further includes automatically resizing the first image. In some embodiments, the method may also involve steps of receiving, via the onboard computing system, a series of pre-programmed coordinates (e.g., GPS) directing the vehicle along a first path, and then causing, in response to receiving the series of pre-programmed coordinates, the vehicle to move along the first path. In such cases, the method may then further include steps of determining, via the onboard computing system, that one or more potential extraction areas include an insufficient composition of target minerals, and causing, in response to determining one or more potential extraction areas include insufficient composition, the vehicle to bypass at least one pre-programmed coordinate set of the series (e.g., see FIG. 9).

In another example, the method includes causing, via the onboard computing system, the vehicle to move to a first location corresponding to a first set of pre-programmed coordinates (e.g., GPS), and then causing, in response to the vehicle arriving at the first location, an imaging device associated with the vehicle to capture a second image. In one example, the method further includes receiving feedback via the computing device regarding an accuracy of the first image classification model, and automatically retraining the first image classification model based on the received feedback.

In another example, the method also includes automatically feeding the plurality of image segments into a second image classification model configured to identify a second physical property of the first outcrop sample that differs from the first physical property. In some embodiments, the method further includes steps of importing a plurality of images, each image including an outcrop sample, and each image being including an assigned concept for the first physical property of its included outcrop sample, and automatically creating, based on the plurality of images and respective assigned concepts, the first image classification model. In addition, in one embodiment, the method includes causing the computing device to present a visualization dashboard that displays at least one of a total number of samples obtained by the vehicle, a total number of images captured by the vehicle, and an estimated area covered by the vehicle during a first period of time.

As described herein, the proposed systems and methods offer significant advantages for preliminary exploration stages of mineral operations over conventional approaches. The use of a GPS-guided vehicle for target identification, the application of on-site remote controlled XRF readings for sample collection and soil composition analysis, and the ability to perform sample analyses on-site and remotely using artificial intelligence models for image classification can result in a wide range of benefits to the mineral operation industry. For example, transforming what has been a primarily manual approach to one that relies on automated, intelligent processes and data analysis will reduce production lead times and increase confidence in mining operation feasibility decisions.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for identifying areas for mineral extraction, the method comprising:
    obtaining, via an onboard computing system for a vehicle, a first image for a first potential extraction area, the first image including a first outcrop sample;
    automatically segmenting the first image into a plurality of image segments that includes a first image segment;
    automatically feeding the plurality of image segments into a first image classification model configured to identify a first physical property of the first outcrop sample based on a first label set associated with the first physical property, wherein the first physical property is one of a color, grain size, and luster;
    automatically feeding the plurality of image segments into a second image classification model configured to identify a second physical property of the first outcrop sample that differs from the first physical property, wherein the second physical property is one of a specific gravity, magnetism, hardness, structure, and texture;
    automatically assigning one label of the first label set to each image segment, the assigned label including the highest likelihood of representing features present in the image segment, wherein an assignment of a first label to the first image segment has a confidence value greater than confidence values for label assignments to the remaining image segments of the plurality of image segments;
    automatically assigning the first label to the first image; and
    causing a computing device to generate a message identifying the first label for the first outcrop sample.

2. The method of claim 1, wherein identification of the second physical property is based on a second label set associated with the second physical property, and the method further comprises automatically assigning one label of the second label set to each image segment, the assigned label including the second highest likelihood of representing features present in the image segment, and an assignment of a second label to the first image segment has a confidence value greater than confidence values of label assignments associated with the second physical property for the remaining image segments of the plurality of image segments.

3. The method of claim 1, further comprising:
    receiving X-ray fluorescence (XRF) data for the first outcrop sample;
    calculating an elemental composition of the first outcrop sample; and
    causing the computing device to present a summary of the elemental composition of the first outcrop sample.

4. The method of claim 1, further comprising:
    receiving, via the onboard computing system, a series of pre-programmed coordinates directing the vehicle along a first path; and
    causing, in response to receiving the series of pre-programmed coordinates, the vehicle to move along the first path to a first potential extraction area corresponding to a first pre-programmed coordinate set.

5. The method of claim 4, further comprising:
    determining, via the onboard computing system, that one or more potential extraction areas include a mineral composition that falls below a minimum threshold; and
    causing, in response to determining one or more potential extraction areas fall below the minimum threshold, the vehicle to bypass at least one pre-programmed coordinate set of the series.

6. The method of claim 1, further comprising:
    causing, via the onboard computing system, the vehicle to move to a first location corresponding to a first set of pre-programmed coordinates; and causing, in response to the vehicle arriving at the first location, an imaging device associated with the vehicle to capture a second image.

7. The method of claim 1, further comprising:
receiving feedback via the computing device regarding an accuracy of the first image classification model; and
automatically retraining the first image classification model based on the received feedback.

8. The method of claim 1, further comprising automatically feeding the plurality of image segments into a third image classification model configured to identify a third physical property of the first outcrop sample that differs from the first physical property and the second physical property, where the third physical property is one of a color, grain size, and luster.

9. The method of claim 1, further comprising:
importing a plurality of images, each image including an outcrop sample, and each image being including an assigned label for the first physical property of its included outcrop sample; and
automatically creating, based on the plurality of images and respective assigned labels, the first image classification model.

10. The method of claim 1, further comprising causing the computing device to present a visualization dashboard that displays at least one of a total number of samples obtained by the vehicle, a total number of images captured by the vehicle, and an estimated area covered by the vehicle during a first period of time.

11. A system of for identifying areas for mineral extraction, the system comprising:
a processor;
machine-readable media including instructions which, when executed by the processor, cause the processor to:
obtain, via an onboard computing system for a vehicle, a first image for a first potential extraction area, the first image including a first outcrop sample;
automatically segment the first image into a plurality of image segments that includes a first image segment;
automatically feed the plurality of image segments into a first image classification model configured to identify a first physical property of the first outcrop sample based on a first label set associated with the first physical property, wherein the first physical property is one of a color, grain size, and luster;
automatically feed the plurality of image segments into a second image classification model configured to identify a second physical property of the first outcrop sample that differs from the first physical property, wherein the second physical property is one of a color, grain size, and luster;
automatically assign one label of the first label set to each image segment, the assigned label including the highest likelihood of representing features present in the image segment, wherein an assignment of a first label to the first image segment has a confidence value greater than confidence values for label assignments to the remaining image segments of the plurality of image segments;
automatically assign the first label to the first image; and
cause a computing device to generate a message identifying the first label for the first outcrop sample.

12. The system of claim 11, wherein the instructions further cause the processor to:

determine, via the onboard computing system, that one or more potential extraction areas include a mineral composition that falls below a minimum threshold; and
cause, in response to determining one or more potential extraction areas fall below the minimum threshold, the vehicle to bypass at least one pre-programmed coordinate set of the series.

13. The system of claim 11, wherein the instructions further cause the processor to:
receive X-ray fluorescence (XRF) data for the first outcrop sample;
calculate an elemental composition of the first outcrop sample; and
cause the computing device to present a summary of the elemental composition of the first outcrop sample.

14. The system of claim 11, wherein the instructions further cause the processor to resize the first image.

15. The system of claim 11, wherein the instructions further cause the processor to:
receive, via the onboard computing system, a series of pre-programmed coordinates directing the vehicle along a first path; and
cause, in response to receiving the series of pre-programmed coordinates, the vehicle to move along the first path.

16. The system of claim 11, wherein the instructions further cause the processor to:
cause, via the onboard computing system, the vehicle to move to a first location corresponding to a first set of pre-programmed coordinates; and
cause, in response to the vehicle arriving at the first location, an imaging device associated with the vehicle to capture a second image.

17. The system of claim 11, wherein the instructions further cause the processor to:
receive feedback via the computing device regarding an accuracy of the first image classification model; and
automatically retrain the first image classification model based on the received feedback.

18. The system of claim 11, wherein identification of the second physical property is based on a second label set associated with the second physical property, and the instructions further cause the processor to automatically assign one label of the second label set to each image segment, the assigned label including the second highest likelihood of representing features present in the image segment, and an assignment of a second label to the first image segment has a confidence value greater than confidence values of label assignments associated with the second physical property for the remaining image segments of the plurality of image segments.

19. The system of claim 11, wherein the instructions further cause the processor to:
import a plurality of images, each image including an outcrop sample, and each image being including an assigned label for the first physical property of its included outcrop sample; and
automatically create, based on the plurality of images and respective assigned labels, the first image classification model.

20. A system comprising one or more computers and one or more storage devices storing instructions that are operable, when executed by the one or more computers, to cause the one or more computers to:
obtain, via an onboard computing system for a vehicle, a first image for a first potential extraction area, the first image including a first outcrop sample;

automatically segment the first image into a plurality of image segments that includes a first image segment;

automatically feed the plurality of image segments into a first image classification model configured to identify a first physical property of the first outcrop sample based on a first label set associated with the first physical property, wherein the first physical property is one of a color, grain size, and luster;

automatically feed the plurality of image segments into a second image classification model configured to identify a second physical property of the first outcrop sample that differs from the first physical property, where the second physical property is one of a specific gravity, magnetism, hardness, structure, and texture;

automatically assign one label of the first label set to each image segment, the assigned label including the highest likelihood of representing features present in the image segment, wherein an assignment of a first label to the first image segment has a confidence value greater than confidence values for label assignments to the remaining image segments of the plurality of image segments;

automatically assign the first label to the first image; and cause a computing device to generate a message identifying the first label for the first outcrop sample.

\* \* \* \* \*